(12) United States Patent
Goldman et al.

(10) Patent No.: US 9,361,421 B2
(45) Date of Patent: Jun. 7, 2016

(54) METHOD AND APPARATUS FOR PLACING AND ROUTING PARTIAL RECONFIGURATION MODULES

(71) Applicant: Altera Corporation, San Jose, CA (US)

(72) Inventors: David Samuel Goldman, Thornhill (CA); Mark Bourgeault, Mississauga (CA); Vaughn Betz, Toronto (CA); Alan Louis Herrmann, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/152,624

(22) Filed: Jan. 10, 2014

(65) Prior Publication Data

US 2014/0237441 A1    Aug. 21, 2014

Related U.S. Application Data

(62) Division of application No. 13/040,255, filed on Mar. 3, 2011, now Pat. No. 8,671,377.

(51) Int. Cl.
*G06F 17/50* (2006.01)

(52) U.S. Cl.
CPC ........ *G06F 17/5077* (2013.01); *G06F 17/5054* (2013.01); *G06F 2217/72* (2013.01)

(58) Field of Classification Search
CPC ............ G06F 17/5054; G06F 15/7867; G06F 17/5077; G06F 17/5045
USPC .................................. 716/116–117, 121, 128
See application file for complete search history.

(56) References Cited

U.S. PATENT DOCUMENTS

| | | | |
|---|---|---|---|
| 6,080,204 A | 6/2000 | Mendel | |
| 6,237,131 B1 * | 5/2001 | MacArthur et al. | .......... 716/117 |
| 6,466,050 B1 * | 10/2002 | Mohammed | ..... H03K 19/17736 |
| | | | 326/38 |
| 7,386,826 B1 * | 6/2008 | Keller et al. | ................... 716/117 |
| 7,541,833 B1 | 6/2009 | Neuendorffer et al. | |
| 7,600,210 B1 | 10/2009 | Mason et al. | |
| 7,640,526 B1 | 12/2009 | Blodget et al. | |
| 7,856,545 B2 | 12/2010 | Casselman | |

OTHER PUBLICATIONS

Extended European Search Report for Application No. EP 12 15 6571.7.
Robinson, et al.; "Methods of Exploiting Simulation Technology for Simulating the Timing of Dynamically Reconfigurable Logic"; IEE Proceedings E. Computers & Digital Techniques, Institution of Electrical Engineers, Stevenage, GB, vol. 147, No. 3, pp. 175-180, May 30, 2000.
Silva, et al.; "Generation of Hardware Modules for Run-Time Reconfigurable Hybrid CPU/FPGA Systems", IET Comput. Digit. Tech., vol. 1, No. 5, pp. 461-471, Sep. 4, 2007.
Koester, et al., "Design Optimization to Improve Placeability of Partial Reconfiguration Module", 2009, EDAA, pp. 1-6.
U.S. Appl. No. 13/040,255, filed Mar. 3, 2011, in Re Application of David Samuel Goldman, et al.
Japanese Laid-Open Publication No. 11-17524 (a document showing well-known technology). [Translator's note: *No English language counterpart could be located].

* cited by examiner

*Primary Examiner* — Nghia Doan
(74) *Attorney, Agent, or Firm* — L. Cho

(57) ABSTRACT

A method for designing a system on a target device includes assigning resources on the target device to static logic modules and partial reconfigurable (PR) modules in the system. The instances of one of the PR modules are placed and routed in parallel utilizing resources from those that are assigned. Other embodiments are also disclosed.

19 Claims, 13 Drawing Sheets

FIG. 4

| Compilation number | Modules compiled on compute node x (Px) | | | Programming files produced |
|---|---|---|---|---|
| | P1 | P2 | P3 | |
| 1 | Top, A, B1, C, D1, E | | | Static region, B1, D1 |
| 2 | B2, D2 | B3, D3 | B4 | B2, D2, B3, D3, B4 |

| Compilation number | Modules compiled on compute node x (Px) | | | | Programming files produced |
|---|---|---|---|---|---|
| | P1 | P2 | P3 | P4 | |
| 1 | Top, A, C, E | | | | Static region |
| 2 | B1, D1 | B2, D2 | B3, D3 | B4 | B1, D1, B2, D2, B3, D3, B4 |

| Compilation number | Modules compiled |
|---|---|
| 1 | Top, A, B1, C, D1, E |
| 2 | B2, D2 |
| 3 | B3, D3 |
| 4 | B4 |

FIG. 11A

| Compilation number | Modules compiled on processor x (Px) | | | |
|---|---|---|---|---|
| | P1 | P2 | P3 | P4 |
| 1 | Top, A, C, E | | | |
| 2 | B1, D1 | B2, D2 | B3, D3 | B4 |

FIG. 11B

| Compilation number | Modules compiled on processor x (Px) | | | |
|---|---|---|---|---|
| | P1 | P2 | P3 | P4 |
| 3 | Top, A, B1 | B2 | | |

METHOD AND APPARATUS FOR PLACING AND ROUTING PARTIAL RECONFIGURATION MODULES

RELATED APPLICATION

This application is a continuation of and claims priority and benefit to U.S. application Ser. No. 13/040,255 filed on Mar. 3, 2011, entitled "Method and Apparatus for Placing and Routing Partial Reconfiguration Modules".

TECHNICAL FIELD

Embodiments of the present invention relate to tools for designing systems on target devices. More specifically, embodiments of the present invention relate to a method and apparatus for placing and routing partial reconfiguration (PR) modules on target devices.

BACKGROUND

Target devices such as field programmable gate arrays (FPGAs), structured application specific integrated circuits (ASICs), and ASICs are used to implement large systems that may include million of gates and megabits of embedded memory. The complexity of a large system often requires the use of electronic design automation (EDA) tools to create and optimize a design for the system onto physical target devices. Among the procedures performed by EDA tools in a computer aided design (CAD) compilation flow are hardware description language (HDL) creation for a system and synthesis, placement, and routing of the system on the target device.

Partial reconfiguration (PR) involves designing a plurality of instances for a PR module on a programmable target device during compilation. Each instance of a PR module represents a different circuit description that can be implemented for the PR module. A selected PR module may be reconfigured from a first instance to a second instance while other PR modules and static modules on the programmable target device remain in active operation.

PR allows a portion of a system to be reconfigured with a programming file created by an EDA tool that represents only that portion of the target device, unlike a typical programming file representing an entire programmable target device. PR also allows a system to be reconfigured without having to power down the programmable target device for the reprogramming. PR can be used for feature upgrades or changes, bug fixes, or any other operation on a device that requires reprogramming without requiring down time to be taken for unaffected portions of the device.

SUMMARY

A method and apparatus for placing and routing of partial configuration (PR) modules on a target device is disclosed. According to a first embodiment of the present invention, resources on the target device are assigned as candidates to be used by particular PR modules in a system. According to an aspect of this embodiment, static logic modules are placed and routed before instances of the PR module are placed and routed, and resources unused by the static logic modules are assigned as candidates to be used by the PR modules. Instances of a PR module are placed and routed on the target device in parallel using the resources assigned. According to an embodiment of the present invention, placing and routing PR modules on the target device in parallel may involve placing and routing PR modules contemporaneous in time.

According to a second embodiment of the present invention, an initial placement and routing is performed on static logic modules and PR modules to discover the candidate sets of resources to be used by the modules. The initial placement and routing freely fits the modules with resources on a target device without imposing prohibitions on which resources are used. Resources that are in conflict for being selected for use with more than one module are identified and arbitrated to static logic modules and PR modules competing for the resource. Unused resources from the initial fit are assigned to static logic modules and PR modules having conflict. A subsequent placement and routing (re-fit) is performed on the static logic modules and PR modules having conflicts with the resources arbitrated and assigned.

According to a third embodiment of the present invention, an initial fit is performed on static logic modules and PR modules. The initial fit freely places and routes the static logic modules and the PR modules using resources on a target device without imposing prohibitions on which resources are used. Resources that are in conflict by use by more than one module are identified. One or more subsequent placement and routing (re-fits) are performed on a static logic modules and a PR module having conflicts until no such conflicts exist.

BRIEF DESCRIPTION OF THE DRAWINGS

The features and advantages of embodiments of the present invention are illustrated by way of example and are not intended to limit the scope of the embodiments of the present invention to the particular embodiments shown.

FIG. 4 is a table illustrating an exemplary schedule for compilation using the method illustrated in FIG. 3.

FIG. 6 is a table illustrating an exemplary schedule for compilation using the method illustrated in FIG. 5.

FIG. 9 is a table illustrating an exemplary schedule for compilation using the method illustrated in FIG. 8.

FIG. 11A and FIG. 11B are tables illustrating exemplary schedules for compilation using the method illustrated in FIG. 10.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and programs are shown in block diagram form to avoid obscuring embodiments of the present invention unnecessarily.

Figure 1:
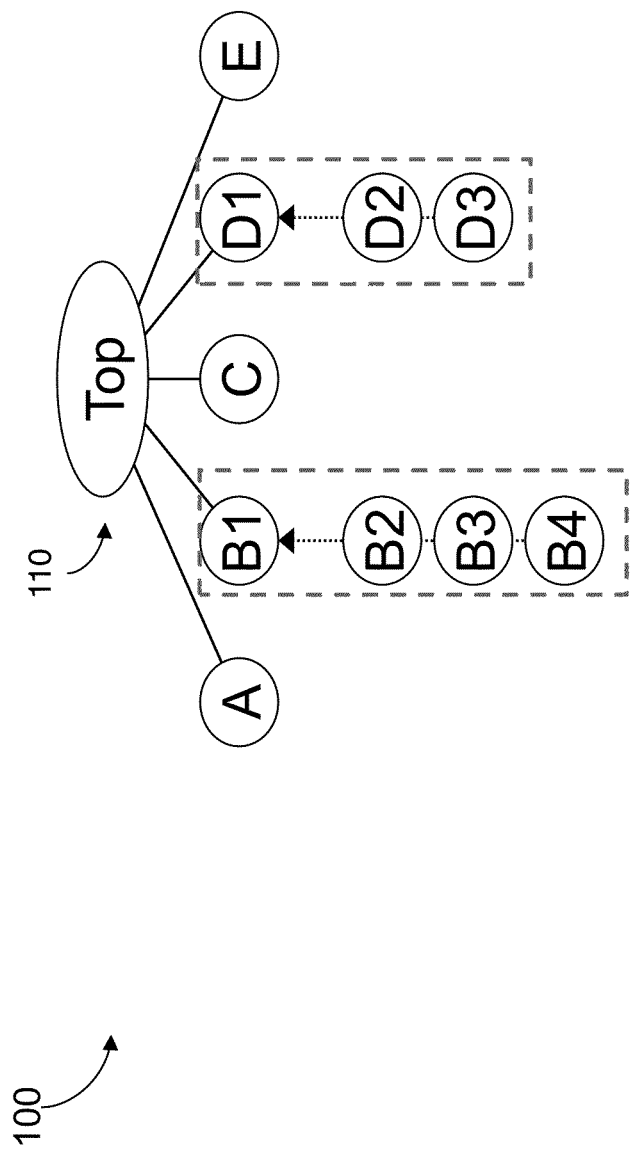
FIG. 1 is a diagram illustrating an exemplary partial reconfiguration (PR) design according to an embodiment of the present invention.

FIG. 1 is a diagram illustrating an exemplary design for a system 100 that uses partial reconfiguration (PR) according to an embodiment of the present invention. The design 100 includes a top-level module 110 that instantiates five lower-level modules, A-E. Each module includes a plurality of components described in register transfer level. Modules A, C, and E, and top-level module 110 are static logic modules. According to an embodiment of the present invention, static logic modules do not change after being programmed on a target device. Modules B and D are PR modules. PR module B has four possible instances, labeled B1-B4. PR module D has three possible instances, labeled D1-D3. According to an embodiment of the present invention, PR modules include a plurality of possible instances where a first instance of a PR module may be changed to a second instance of the PR module after the PR modules are programmed on a target device. Each instance of a PR module represents a different register transfer level (RTL) that can be implemented for the PR module.

According to an embodiment of the present invention, each instance of a PR module includes one or more input ports and one or more output ports. Each input port and output port interfaces with the same static logic on the target device such that the boundaries of the PR module are logically consistent. The input port of each instance of a PR module may be programmed by configurable random access memory (CRAM) bits to receive data from static logic at its boundary. Similarly, the output port of each instance of a PR module may be programmed by CRAM bits to transmit data to static logic at its boundary. It is appreciated that the static logic at the boundary of a PR module may be implemented with a register, a look up table (LUT), a wire, or other component.

Figure 2:
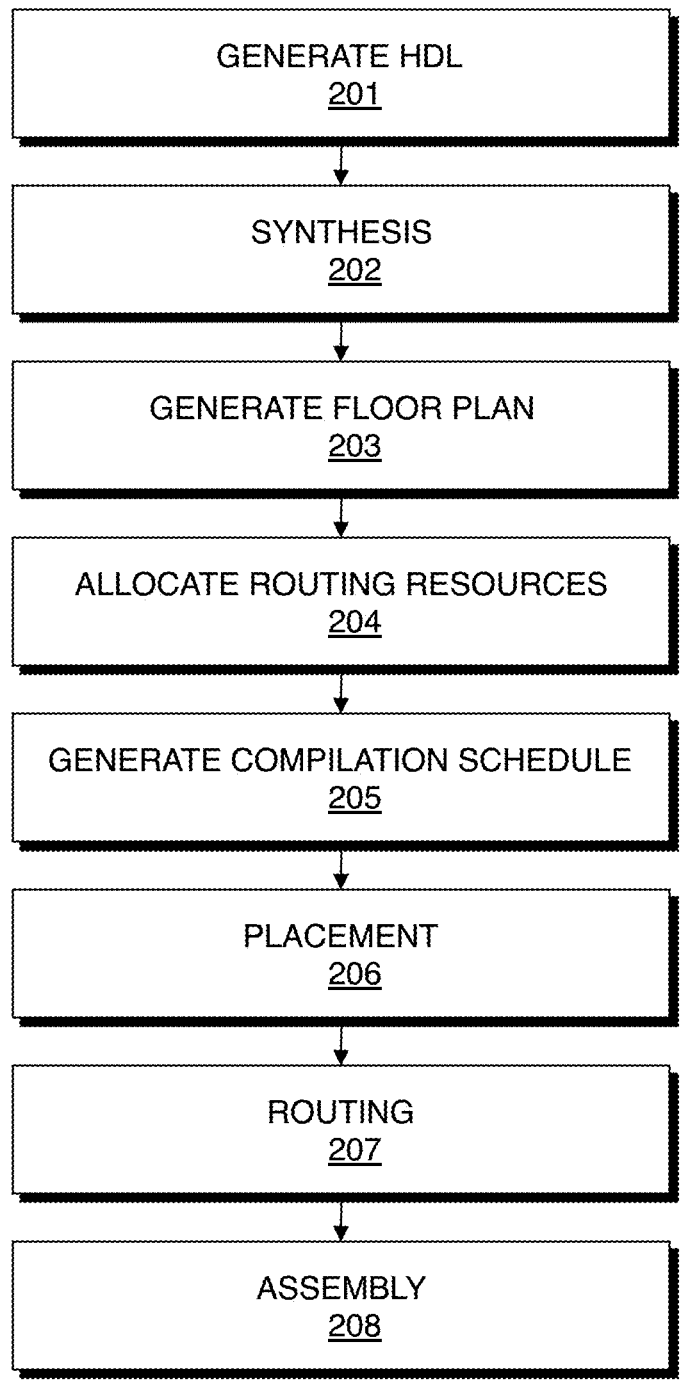
FIG. 2 is a flow chart illustrating a method for designing a system with PR modules on a target device using static resource allocation according to an exemplary embodiment of the present invention.

FIG. 2 is a flow chart illustrating a method for designing a system with PR modules on a target device using static resource allocation according to an exemplary embodiment of the present invention. The target device may be a field programmable gate array (FPGA), application specific integrated circuit (ASIC), a structured ASIC, or other programmable device. According to one embodiment, the procedure illustrated in FIG. 2 may be performed by a computer aided design (CAD)/electronic design automation (EDA) tool implemented on a computer system. At 201, a hardware description language (HDL) design definition is generated to describe the system. The HDL is generated in response to specifications of the system provided by a designer. The specifications may be provided by a designer through a design entry tool. The specifications may describe components and interconnections in the system. According to an embodiment of the present invention, identification of portions of the specifications that are to be implemented as static logic modules and PR modules are also provided by the designer.

At 202, the system is synthesized. Synthesis includes generating a logic design of the system to be implemented by the target device. According to an embodiment of the present invention, synthesis generates an optimized logical representation of the system which includes the static logic modules and PR modules from the HDL design definition. Synthesis also includes mapping the optimized logic design. Mapping includes determining how to implement logic gates and logic elements in the optimized logic representation with specific resources on the target device. According to an embodiment of the present invention, a netlist is generated from mapping. This netlist may be an optimized technology-mapped netlist generated from the HDL.

At 203, a floor plan is generated for the design of the system. According to an embodiment of the present invention, the floor plan designates physical locations ("floor plan regions") on the target device to the synthesized logic generated at 202. According to an embodiment of the present invention, a floor plan region on the target device may be assigned to each of the static modules and PR modules generated from synthesis.

Figure 3:
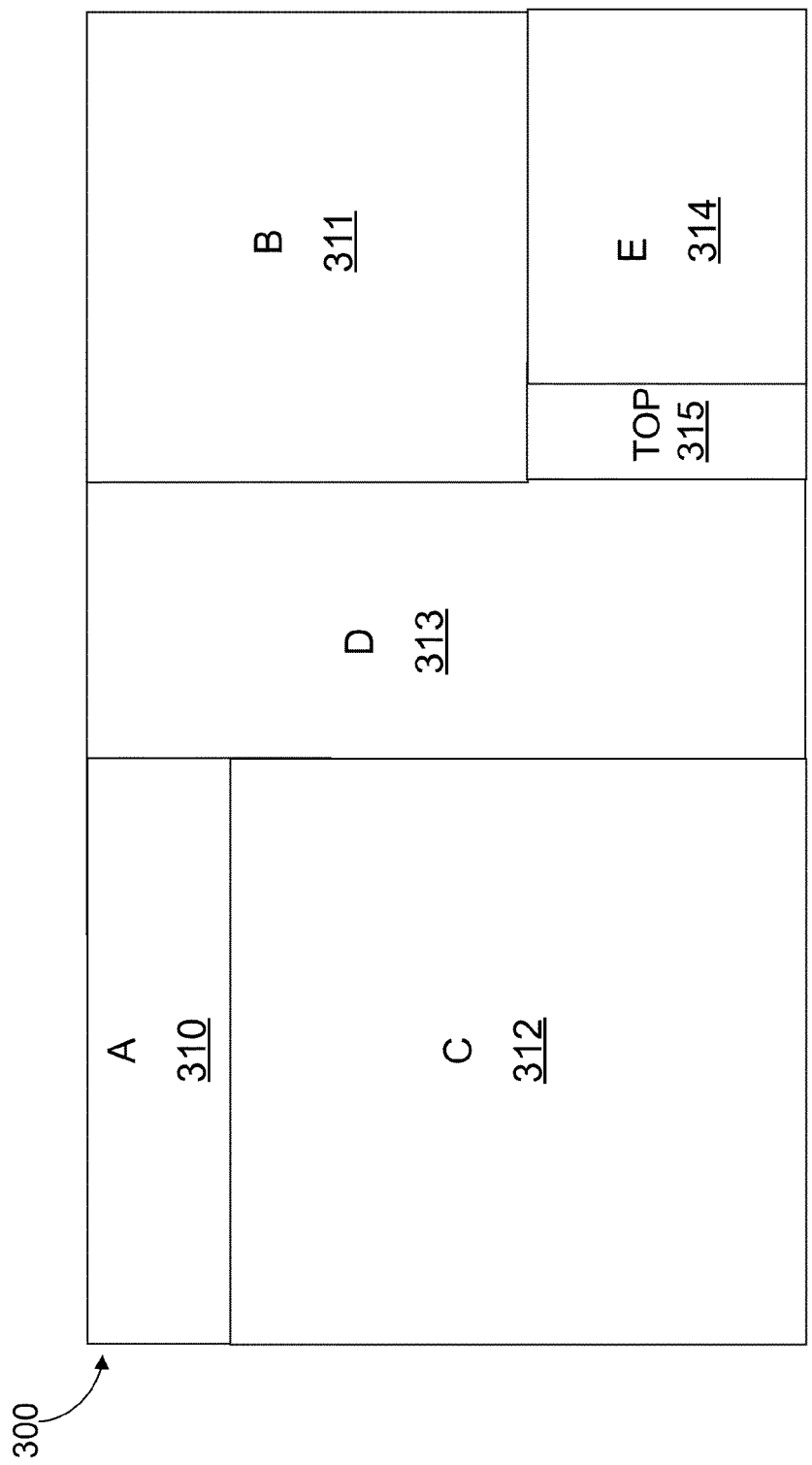
FIG. 3 illustrates an exemplary floor plan of a design used for static resource allocation according to an embodiment of the present invention.

FIG. 3 illustrates an exemplary floor plan 300 for the design 100 illustrated in FIG. 1. Floor plan regions 310, 312, 314, and 315 are assigned to static modules A, C, E, and top, respectively. Floor plan region 311 is assigned to PR module B and is thus implicitly assigned to instances B1-B4. Floor plan region 313 is assigned to PR module D and is thus implicitly assigned to instances D1-D3. According to an embodiment of the present invention, the floor plan regions may have any dimension or shape, and need not be contiguous. It is appreciated that the floor plan may be generated by a CAD/EDA tool in response to input provided by a designer regarding the size, shape, and/or location of floor plan regions to assign a module. Alternatively, the floor plan may be generated by a CAD/EDA tool by analysis of the synthesis output netlist alone and independent of any input provided by the designer.

Referring back to FIG. 2, at 204, routing resources on the target device are allocated to static logic modules and PR modules. According to an embodiment of the present invention, the floor plan region assigned to a module is used for static resource allocation. In this embodiment, a module is allowed to use only the routing resources that are located in its assigned floor plan region. By statically allocating and assigning the routing resources to the static modules and PR modules in the system, the PR modules may be routed in any order during or after the routing of static logic modules. In addition, routing of instances of PR modules may be performed in parallel. A plurality of compute nodes may be utilized to facilitate parallel compilation. According to an embodiment of the present invention, a compute node includes processing resources to perform compilation procedures such as placement and routing. A compute node may be implemented by a processor or a processor core in a computer system.

At 205 a compilation schedule is generated. The compilation schedule determines when a static logic module and PR module in the design are compiled and by which compute node. The compilation performed may include the placement and routing of a static logic module and PR module. According to an embodiment of the present invention, the compilations are scheduled such that a largest number of available compute nodes are utilized to perform as many compilations in parallel. According to an embodiment of the present invention, the compilation schedule schedules compilation of all of the static logic modules and a first instance of each PR module together on a first compute node in a first compilation. The compilation schedule then schedules compilation of the remaining instances of each PR module to be compiled in parallel on available compute nodes in a second compilation. Instances of different PR modules may be compiled together by a same compute node during a same compilation. Instances of the same PR module may not be compiled together by a same compute node during a same compilation, since multiple such modules may utilize the same resources as they are not programmed to the chip at the same time. Additional compilations may be scheduled to compile instances of the PR modules that have not be been compiled. In an alternate embodiment, only one compute node is available and the scheduling procedure orders compilations sequentially to be compiled on a single compute node.

FIG. 4 is a table illustrating an exemplary schedule for compilation using the method illustrated in FIG. 3 for the design 100 illustrated in FIG. 1. As shown in FIG. 4, the static logic modules and PR modules in the design 100 are compiled using 3 compute nodes, P1-P3, in two compilations. During compilation 1, first compute node P1 compiles modules Top, A, B1, C, D1, and E. During compilation 2, the first compute P1 compiles modules B2 and D2, second compute node P2 compiles modules B3 and D3, and the third compute node P3 compiles module B4.

Referring back to FIG. 2, at 206, the system is placed. According to an embodiment of the present invention, placement involves placing the mapped logical system design on the target device at floor planned regions assigned to the modules. Placement works on the technology-mapped netlist to produce a placement for each of the functional blocks. According to an embodiment of the present invention, placement includes fitting the system on the target device by determining which resources on the logic design are to be used for specific logic elements, and other function blocks determined to implement the system as determined during synthesis. Placement may include clustering which involves grouping logic elements together to form the logic clusters present on the target device. According to an embodiment of the present invention, clustering is performed at an early stage of placement and occurs after synthesis during the placement preparation stage.

At 207, the placed design is routed. According to an embodiment of the present invention, the routing resources allocated to the modules at 204 are used to provide interconnections between logic gates, logic elements, and other components in the static logic modules and PR modules. Routability optimization may also be performed on the placed logic design. According to an embodiment of the present invention, the goal of routability optimization is to reduce the amount of wiring used to connect components in the placed logic design. Routability optimization may include performing fanout splitting, logic duplication, logical rewiring, or other procedures. It is appreciated that one or more of the procedures may be performed on the placed logic design.

According to an embodiment of the present invention, the routing and placement procedures described at 206 and 207 are performed according to the compilation schedule generated at 205. In this embodiment, compute nodes are used to execute instances of the placement and processing procedures for one or more compilations. Each compute node is assigned specific modules to place and route during a particular compilation number. By utilizing a plurality of compute nodes, instances of PR modules may be routed in parallel.

At 208, an assembly procedure is performed. The assembly procedure involves creating multiple data files that include information determined by the compilation procedure described. A data file may be a bit stream that may be used to program the entire target device, or a bit stream that may be used to program only specific parts of the target device. According to an embodiment of the present invention, the procedures illustrated in FIG. 2 may be performed by an EDA tool executed on a first computer system. The data files generated may be transmitted to a second computer system to allow the design of the system to be further processed. Alternatively, the data files may be transmitted to a second computer system which may be used to program the target device according to the system design. It is appreciated that the design of the system may also be output in other forms such as on a display device or other medium. The target device may be programmed with a data file that includes information to program or initialize the entire chip, and portions of the chip may be re-programmed using other data files that contain information to program only those portions. By programming the target with a data file, components on the target device are physically transformed to implement the system.

Figure 5:
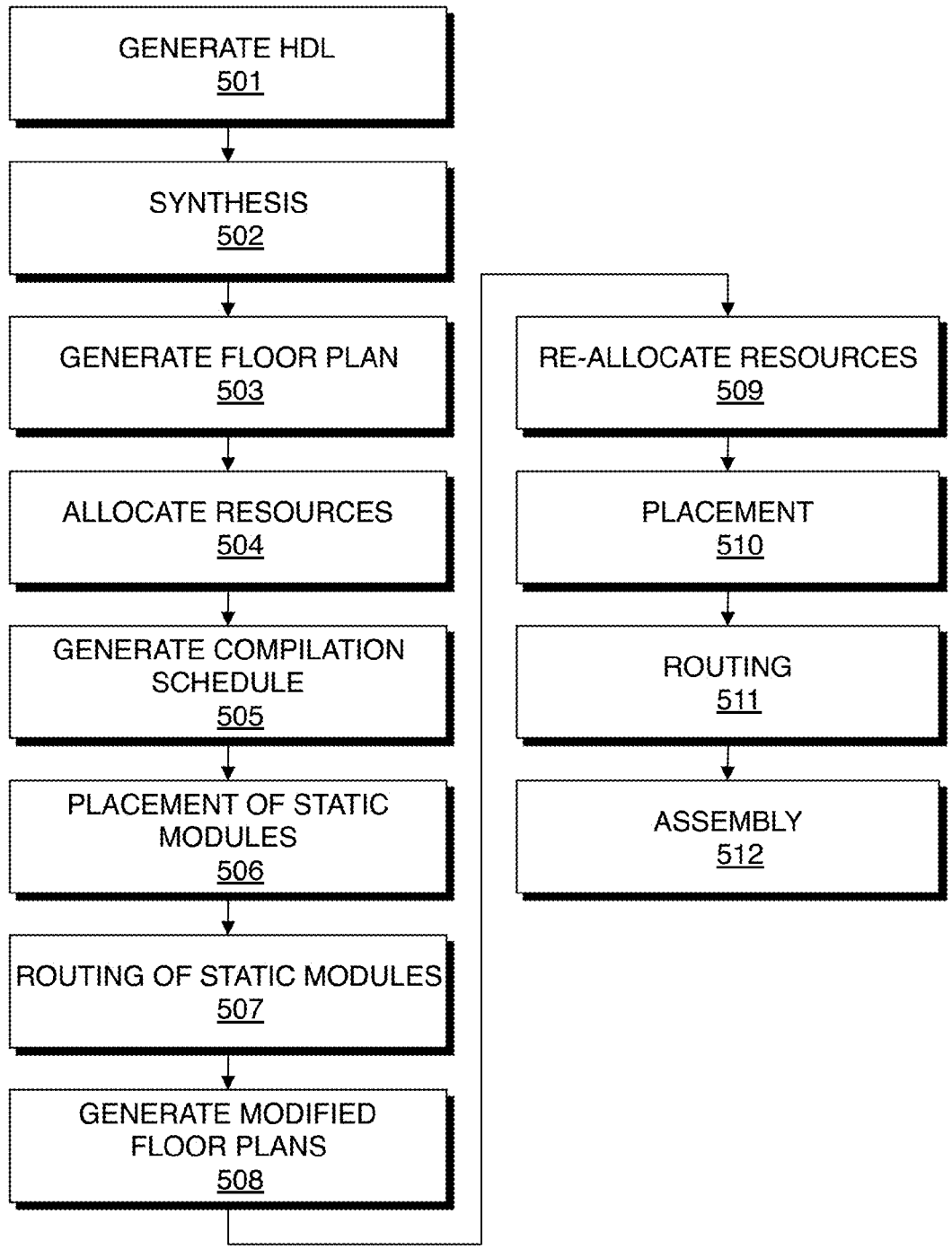
FIG. 5 is a flow chart illustrating a method for designing a system with PR modules on a target device using static resource allocation and reallocation according to an exemplary embodiment of the present invention.

FIG. 5 is a flow chart illustrating a method for designing a system with PR modules on a target device using static resource allocation and re-allocation according to an exemplary embodiment of the present invention. At 501, an HDL design for the system is generated. At 502, synthesis is performed on the system. At 503, a floor plan is generated for the system. At 504, routing resources are allocated to static logic modules and PR modules in the system. According to an embodiment of the present invention, procedures 201-204 described with reference to FIG. 2 may be used to implement procedures 501-504.

At 505, a compilation schedule is generated. The compilation schedule determines when a static logic module and PR module in the design are compiled and by which compute node. The compilation performed may include the placement and routing of a static logic module and PR module. According to an embodiment of the present invention, the compilations are scheduled such that a largest number of available compute nodes are utilized to perform as many compilations in parallel. According to an embodiment of the present invention, the compilation schedule schedules compilation of all of the static logic modules together on a first compute node in a first compilation. The compilation schedule then schedules compilation of the instances of each PR module to be compiled in parallel on available compute nodes in a second compilation. Instances of different PR modules may be compiled together by a same compute node during a same compilation. Instances of the same PR module may not be compiled together by a same compute node during a same compilation. Additional compilations may be scheduled to compile instances of the PR modules that have not be been compiled. In another embodiment, only one compute node is available and the scheduling procedure orders compilations sequentially to be compiled on a single compute node.

FIG. 6 is a table illustrating an exemplary schedule for compilation using the method illustrated in FIG. 5 for the design 100 illustrated in FIG. 1. As shown in FIG. 6, the static logic modules and PR modules in the design 100 are compiled using 4 compute nodes, P1-P4, in two compilations. During compilation 1, first compute node P1 compiles static logic module Top, A, C, and E. During compilation 2, the first compute node P1 compiles PR modules B1 and D1, the second compute node P2 compiles PR modules B2 and D2, the third compute node P3 compiles PR modules B3 and D3, and the fourth compute node P4 compiles PR module B4.

Referring back to FIG. 5, at 506 and 507, the static logic modules in the system are placed and routed. In this manner, compilation 1 from FIG. 6 is performed. According to an embodiment of the present invention, procedures 206-207 described with reference to FIG. 2 may be used to implement procedures 506-507 on the static logic modules. In addition, routing resources allocated to a PR logic module that are required for an instance of a PR module to connect to or from a static logic module ("route through") are re-allocated to the instance of the PR module. A connection from a static module that must route to or from a PR module or static module through a different PR module's assigned floorplan area can be determined by analysis of the design netlist. A connection from one PR module to another may only be accomplished through the static logic boundary and therefore can be treated as a static-to-static connection (possibly using resources assigned to a PR region). According to an embodiment of the present invention, the placement and routing procedures described at 506 and 507 are performed according to the first row of the compilation schedule generated at 505.

At 508, a modified floor plan is generated. The modified floor plan expands the floor plan regions that were assigned to PR modules to include areas of floor plan regions previously assigned to static logic modules. According to an embodiment of the present invention, a procedure may be utilized where the border of each floor plan region allocated to a PR module is iteratively extended. In this embodiment, horizontal boundary edges of each floor plan regions is moved vertically and vertical boundary edges of each of the floor plan regions is moved horizontally until the horizontal boundary edges and vertical boundary edges reach a boundary of the target device or a boundary edge corresponding to another PR module. It should be appreciated that other procedures for modifying the floor plan may be used, including procedures which preferentially grow floor plan regions for which routability and timing issues have been predicted.

At 509, device resources are re-allocated. Unused resources previously assigned to static logic modules are re-assigned to the PR modules. According to an embodiment of the present invention, each PR module is allowed to use unused resources located in its assigned floor plan region. By statically allocating and assigning the resources to the PR modules in the system, the PR modules may be placed and routed in any order. In addition, placement and routing of instances of PR modules may be performed in parallel. A plurality of processing nodes may be utilized to facilitate parallel compilation. According to an embodiment of the present invention, a processing node includes processing resources to perform compilation procedures such as placement and routing.

Figure 7:
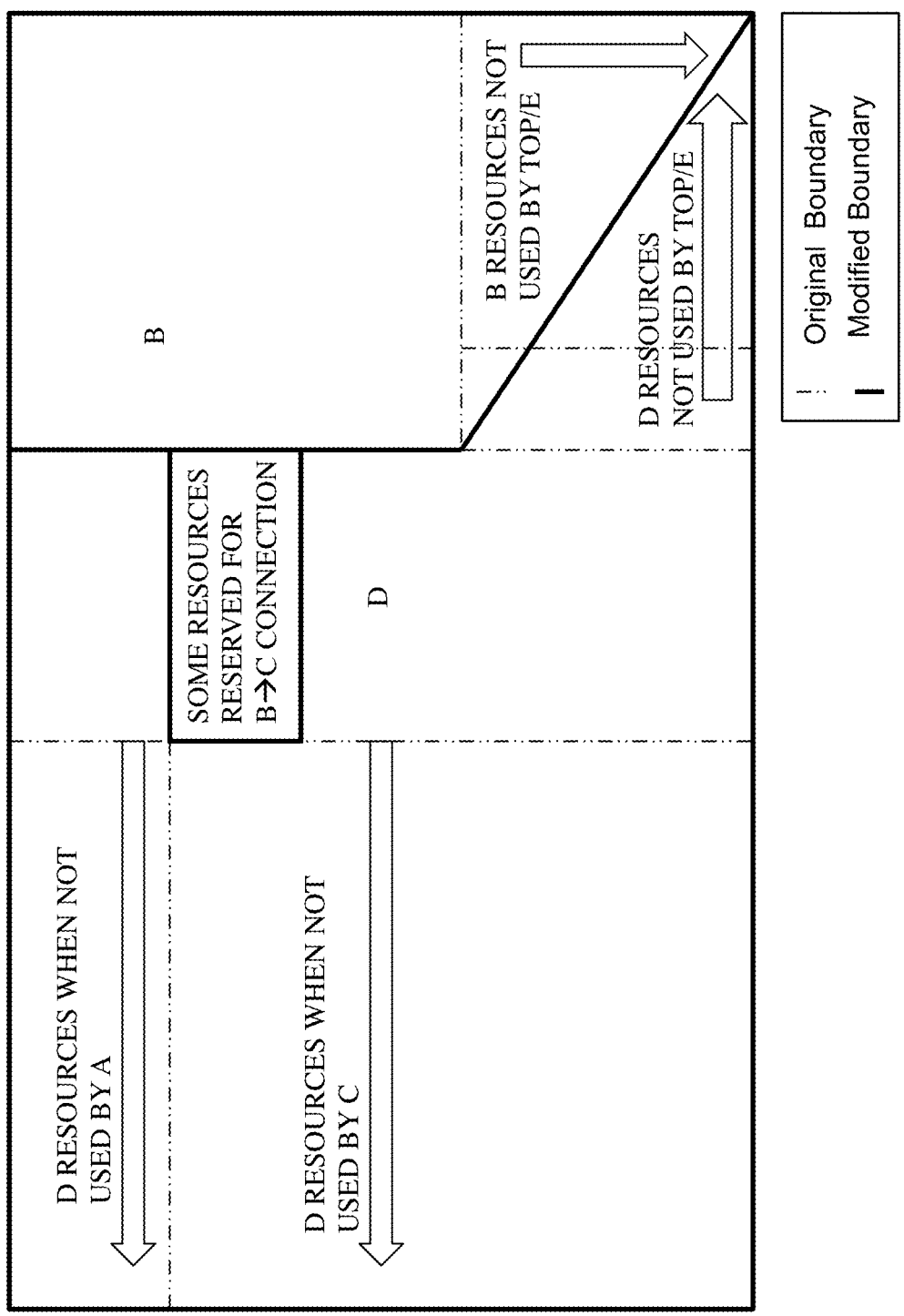
FIG. 7 illustrates an exemplary modified floor plan of a design used for static resource allocation according to an embodiment of the present invention.

FIG. 7 illustrates an exemplary modified floor plan 700 of a design used for static resource allocation according to an embodiment of the present invention. As illustrated, the floor plan region 311 assigned to PR module B illustrated in FIG. 3 is expanded to include floor plan regions previously assigned to static logic modules Top and E. Resources unused by static logic modules Top and E are available to PR module B. The floor plan region 313 assigned to PR module D illustrated in FIG. 3 is expanded to include floor plan regions previously assigned to static logic modules A, C, E, and Top. Resources unused by static logic modules A, C, E, and Top are available to PR module D.

Referring back to FIG. 5, at 510 and 511, the PR modules in the system are placed and routed. According to an embodiment of the present invention, procedures 206-207 described with reference to FIG. 2 may be used to implement procedures 510-511 on the PR modules. According to an embodiment of the present invention, the placement and routing procedures described at 510 and 511 are performed according to the compilation schedule generated at 505. In this embodiment, compute nodes are used to execute instances of the routing and placement procedures for one or more compilations. Each compute node is assigned specific modules to place and route during a particular compilation number. By utilizing a plurality of compute nodes, instances of PR modules may be routed in parallel.

At 512, an assembly procedure is performed. According to an embodiment of the present invention, procedures 208 described with reference to FIG. 2 may be used to implement procedure 512.

The method described in FIG. 5 provides several advantages over the method described in FIG. 2. For example, by re-allocating routing resources unused by static logic modules, the unused routing resources on a target device may be better utilized. In addition, the method described in FIG. 5 allows PR modules to route through a static logic module which reduces the limitations on inter-module communication. It is appreciated that the method of FIG. 2 may also be modified with this enhancement.

Figure 8:
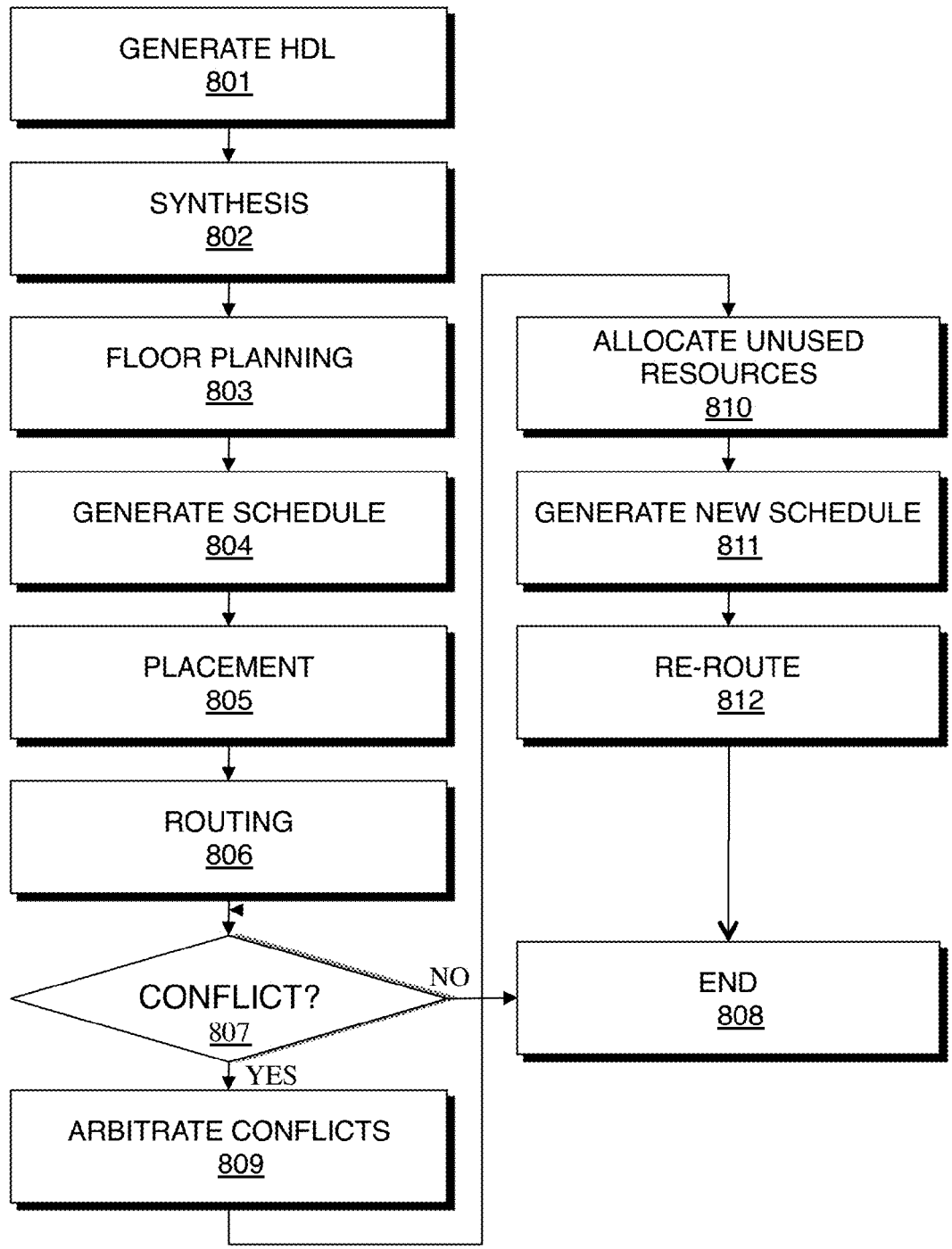
FIG. 8 is a flow chart illustrating a method for designing a system with PR modules on a target device using static resource allocation with auto discovery according to an exemplary embodiment of the present invention.

FIG. 8 is a flow chart illustrating a method for designing a system with PR modules on a target device using static resource allocation with auto discovery according to an exemplary embodiment of the present invention. At 801, an HDL design for the system is generated. At 802, synthesis is performed on the system. At 803, a floor plan is generated for the system. According to an embodiment of the present invention, procedures 201-203 described with reference to FIG. 2 may be used to implement procedures 801-803.

At 804, a compilation schedule is generated. The compilation schedule determines when a static logic module and PR module in the design are compiled. The compilation performed may include the placement and routing of a static logic module and PR module. According to an embodiment of the present invention, the compilation schedule schedules compilation of all of the static logic modules and a first instance of the PR modules together on a single compute node in a first compilation. The compilation schedule then schedules compilation of a next instance of each of the PR modules to be compiled together in a second compilation. Instances of different PR modules may be compiled together by the single compute node during a same compilation. Additional compilations may be scheduled to compile instances of the PR modules that have not be been compiled. In another embodiment, only one compute node is available and the scheduling procedure orders compilations sequentially to be compiled on a single compute node.

FIG. 9 is a table illustrating an exemplary schedule for compilation using the method illustrated in FIG. 8 for the design 100 illustrated in FIG. 1. As shown in FIG. 9, the static logic modules and PR modules in the design 100 are compiled using a single compute node in 4 compilations. During compilation 1, nodes Top, A, B1, C, D1 and E are compiled together. During compilation 2, nodes B2 and D2 are compiled together. During compilation 3, nodes B3 and D3 are compiled together. During compilation 4, node B4 is compiled.

Referring back to FIG. 8, at 805, the static logic modules and PR modules in the system are placed. According to an embodiment of the present invention, the procedure 206 described with reference to FIG. 2 may be used to implement procedure 805 on the static logic modules and PR modules.

At 806, the placed system is routed. According to an embodiment of the present invention, routing resources on the target device are selected to provide interconnections between logic gates, logic elements, and other components in the static logic modules and PR modules. In this embodiment, the static logic modules and PR modules are allowed to be routed using routing resources anywhere on the target device. This procedure for routing may be referred to as "auto-discovery" as modules are allowed to route freely to discover routing resources that are needed. According to an embodiment of the present invention, an order of preference is used when selecting routing resources for the modules. Routing resources selected for a first instance of a PR module are preferentially selected to be used for a second instance of the PR module over selecting other routing resources. Routing resources that are unused by other static logic modules and PR modules are preferentially selected over selecting routing resources that are already used by the other static modules or PR modules in earlier compilation numbers.

According to an embodiment of the present invention, the placement and routing procedures described at 805 and 806 are performed according to the compilation schedule generated at 804. In this embodiment, a single compute node is used to execute a single instance of the placement and processing procedures for a plurality of compilations.

At 807, it is determined whether there are any routing resources that are in conflict. Routing resources that are selected to be used by instances of different PR modules or of an instance of a PR module and a static module are considered to be in conflict. The modules selecting the same routing resource are considered to be competing modules. If no routing resources are determined to be in conflict, control proceeds to 808. If a routing resource is determined to be in conflict, control proceeds to 809.

At 808, control terminates the procedure.

At 809, routing resources in conflict are arbitrated. According to an embodiment of the present invention, each of the routing resources that are in conflict is assigned to one of the competing modules that selected it. It is appreciated that a routing resource may be arbitrated based on a timing constraint or routing constraint associated with a module, or other criteria. Alternatively, arbitration of a routing resource may be based on random assignment.

At 810, unused routing resources are allocated. Unused routing resources from the routing at 806 are assigned to static logic modules and PR modules having a conflict. According to an embodiment of the present invention, the detailed routing resources discovered in 806 are used to generate an updated set of resources to be assigned as candidates for a module's routing. Signals that did not achieve their discovered resource in the arbitration for that resource are allocated resources in the vicinity of the desired wire to have access to alternative choices in an upcoming routing. It should be appreciated, that the details for the particular procedure for arbitration and allocation are particular to the specifics of the devices routing connectivity and that other procedures may be used.

At 811, a new compilation schedule is generated. The new compilation schedule determines when one or more modules having conflicts are re-compiled. The re-compilation performed may include the re-routing of one or more netlist modules having conflicts on their routing. According to an embodiment of the present invention, instances of different PR modules may be re-compiled together by the single compute node during a same re-compilation.

At 812, modules having conflicts are re-routed with the routing resources arbitrated at 809 and assigned at 810 according to the compilation schedule generated at 811. According to an embodiment of the present invention, only modules having conflicts are re-routed. Modules not having conflicts utilize their earlier routing selections. Since the arbitration produced a static resource assignment that was free of conflicts, we are guaranteed that there are no further conflicts. The procedure terminates with a successful route. In another embodiment where the arbitration and allocation steps may result in a failure to route due to imperfect static resource assignments, procedure may return to step 807 with the details of which arbitration and allocation decisions need to be changed.

The preferential order of 805 effectuates a non-parallel compilation. According to an alternate embodiment, instead of generating a compilation schedule where a single compute node is utilized to execute a single instance of placement and routing serially, a plurality of compute nodes may be utilized to execute a plurality of instances of placement and routing in parallel. In this embodiment, different instances of a PR module may be compiled in parallel on available compute nodes during a same compilation. Instances of different PR modules may also be compiled together by a same compute node during a same compilation. In this embodiment the likelihood of conflicts increases since each routing is done without knowledge of the results of other routings.

The method described in FIG. 8 performs placement using a floor plan generated at 803. It is appreciated that in an alternate embodiment of the present invention, placement may be performed in an auto-discovery manner where placement is not constrained by the floor plan. In this embodiment, placement conflicts as well as routing conflicts would be identified at 807 and a re-placement procedure would be performed after a new schedule is generated at 811.

Figure 10:
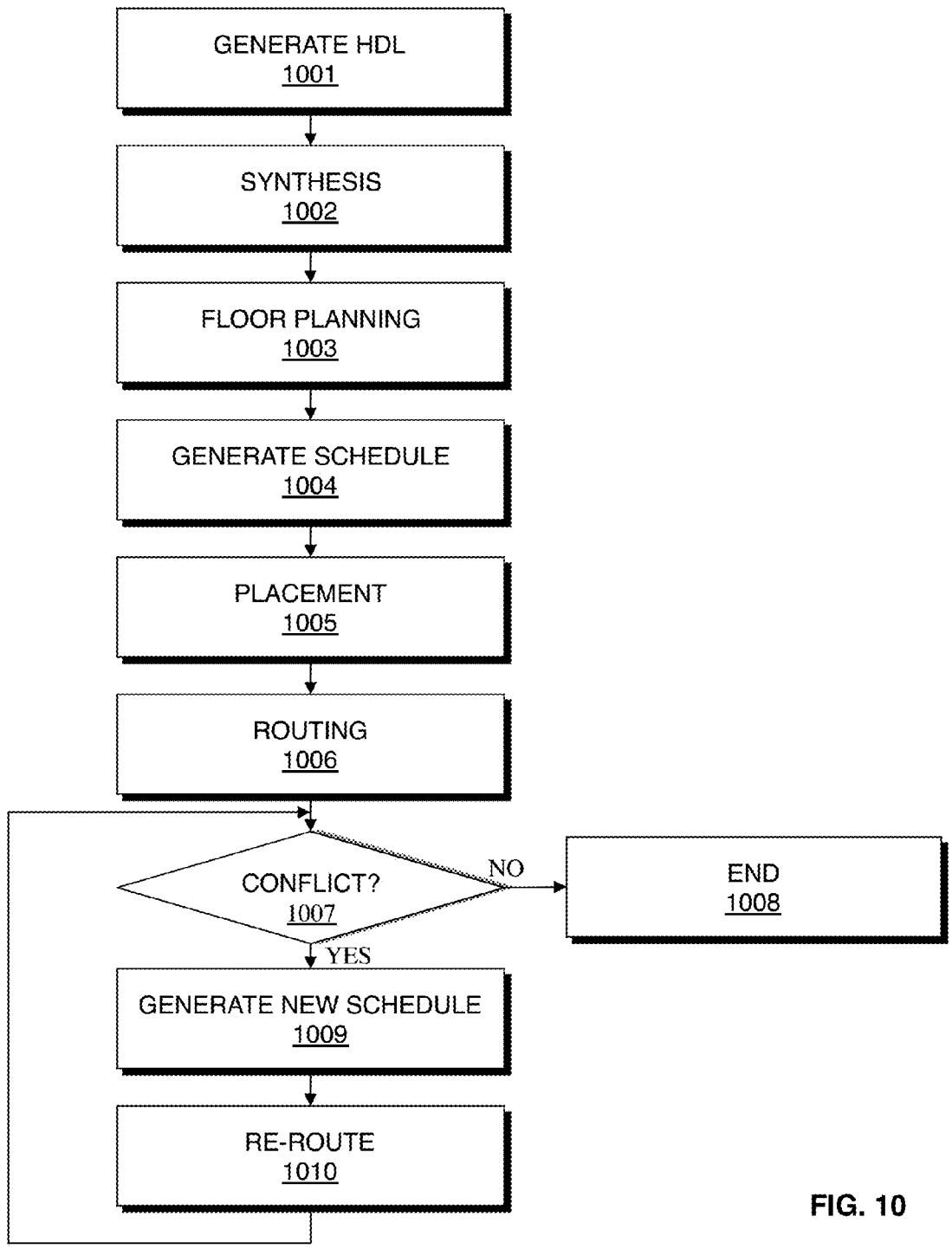
FIG. 10 is a flow chart illustrating a method for designing a system with PR modules on a target device using dynamic resource allocation according to an exemplary embodiment of the present invention.

FIG. 10 is a flow chart illustrating a method for designing a system with PR modules on a target device using dynamic resource allocation according to an exemplary embodiment of the present invention. In this embodiment, no static allocation of resources to modules is performed. Instead, the placement and routing operations run until convergence on a legal solution. At 1001, an HDL design for the system is generated. At 1002, synthesis is performed on the system. At 1003, a floor plan is generated for the system. In an alternate embodiment of the present invention, no floor plan is created. According to an embodiment of the present invention, procedures 201-203 described with reference to FIG. 2 may be used to implement procedures 1001-1003.

At 1004, a compilation schedule is generated. The compilation schedule determines when a static logic module and PR module in the design are compiled and by which compute node. The compilation performed may include the placement and routing of a static logic module and PR module. According to an embodiment of the present invention, the compilations are scheduled such that as many available compute nodes are utilized to perform as many compilations in parallel. According to an embodiment of the present invention, the compilation schedule schedules compilation of all of the static logic modules together on a first compute node in a first compilation. The compilation schedule then schedules compilation of the instances of each PR module to be compiled in parallel on available compute nodes in a second compilation. Instances of different PR modules may be compiled together by a same compute node during a same compilation. Additional compilations may be scheduled to compile instances of the PR modules that have not be been compiled. In another embodiment, only one compute node is available and the scheduling procedure orders compilations sequentially to be compiled on a single compute node.

FIG. 11A is a table illustrating an exemplary schedule for compilation using the method illustrated in FIG. 10 for the design 100 illustrated in FIG. 1. As shown in FIG. 11, the static logic modules and PR modules in the design 100 are compiled using 4 compute nodes, P1-P4, in two compilations.

During compilation 1, first compute node P1 compiles static logic modules Top, A, C, and E. During compilation 2, the first compute node P1 compiles modules B1 and D1, the second compute node P2 compiles modules B2 and D2, the third compute node P3 compiles modules B3 and D3, and the fourth compute node P4 compiles module B4.

Referring back to FIG. 10, at 1005, the static logic modules and PR modules in the system are placed. According to an embodiment of the present invention, the procedure 206 described with reference to FIG. 2 may be used to implement procedure 1005 on the static logic modules and PR modules.

At 1006, the placed system is routed. According to an embodiment of the present invention, routing resources on the target device are selected to provide interconnections between logic gates, logic elements, and other components in the static logic modules and PR modules. In this embodiment, the static logic modules and PR modules are allowed to be routed using routing resources anywhere on the target device. This procedure for routing may be referred to as "auto-discovery" as modules are allowed to route freely to discover routing resources that are needed. According to an embodiment of the present invention, an order of preference is used when selecting routing resources for the modules. Routing resources selected for a first instance of a PR module are preferentially selected to be used for a second instance of the PR module over selecting other routing resources. Routing resources that are unused by other static logic modules and PR modules are preferentially selected over selecting routing resources that are used by the other static modules or PR modules.

According to an embodiment of the present invention, placement and routing procedures described at 1005 and 1006 are performed according to the compilation schedule generated at 1004. In this embodiment, a plurality of compute nodes execute a plurality of instances of the placement and processing procedures to allow instances of PR modules to be compiled in parallel.

At 1007, it is determined whether there are any routing resources that are in conflict. Routing resources that are selected to be used by more than one module are considered to be in conflict. The modules selecting the same routing resource are considered to be competing modules. If no routing resources are determined to be in conflict, control proceeds to 1008. If a routing resource is determined to be in conflict, control proceeds to 1009.

At 1008, control terminates the procedure.

At 1009, a new compilation schedule is generated. The new compilation schedule determines when one or more nodes having conflicts are to be re-compiled and by which compute node. The re-compilation performed may include the re-routing of one or more nodes having conflicts. According to an embodiment of the present invention, instances of different PR modules may be re-compiled together by the single compute node during a same re-compilation.

FIG. 11B is a table illustrating an exemplary new schedule for compilation using the method illustrated in FIG. 10 for the design 100 illustrated in FIG. 1. In this example, conflicts were detected between the static logic module Top and PR module B1, and the static logic module A and PR module B2. The new schedule schedules a re-routing of these modules. During compilation 3, first compute node P1 compiles static logic modules Top and A, and PR module B1. During compilation 3, the second compute node P2 compiles module B2.

At 1010, modules having conflicts are re-routed. According to an embodiment of the present invention, the static logic modules and PR modules having conflicts are allowed to be routed using routing resources anywhere on the target device.

According to an embodiment of the present invention, an order of preference is used when selecting routing resources for the modules. Routing resources selected for a first instance of a PR module are selected to be used for a second instance of the PR module before selecting other routing resources. Routing resources that are unused by other static logic modules and PR modules are selected before selecting routing resources that are used by the other static modules or PR modules. Control returns to 1007. Procedures 1007-1010 may iterate and the selection preferences described at 1010 may be implemented in a cost function which allows the procedure to converge on a solution.

According to an alternate embodiment of the present invention, placement may be also be performed in an auto-discovery manner where it is not constrained by a floor plan. In this embodiment, placement conflicts are identified with routing conflicts at 1007 and a re-placement procedure would be performed after a new schedule is generated at 1009.

FIGS. 2, 5, 8, and 10 are flow charts that illustrate embodiments of the present invention. Some of the techniques illustrated may be performed sequentially, in parallel or in an order other than that which is described and that the procedures described may be repeated. It is appreciated that not all of the techniques described are required to be performed, that additional techniques may be added, and that some of the illustrated techniques may be substituted with other techniques.

Figure 12:
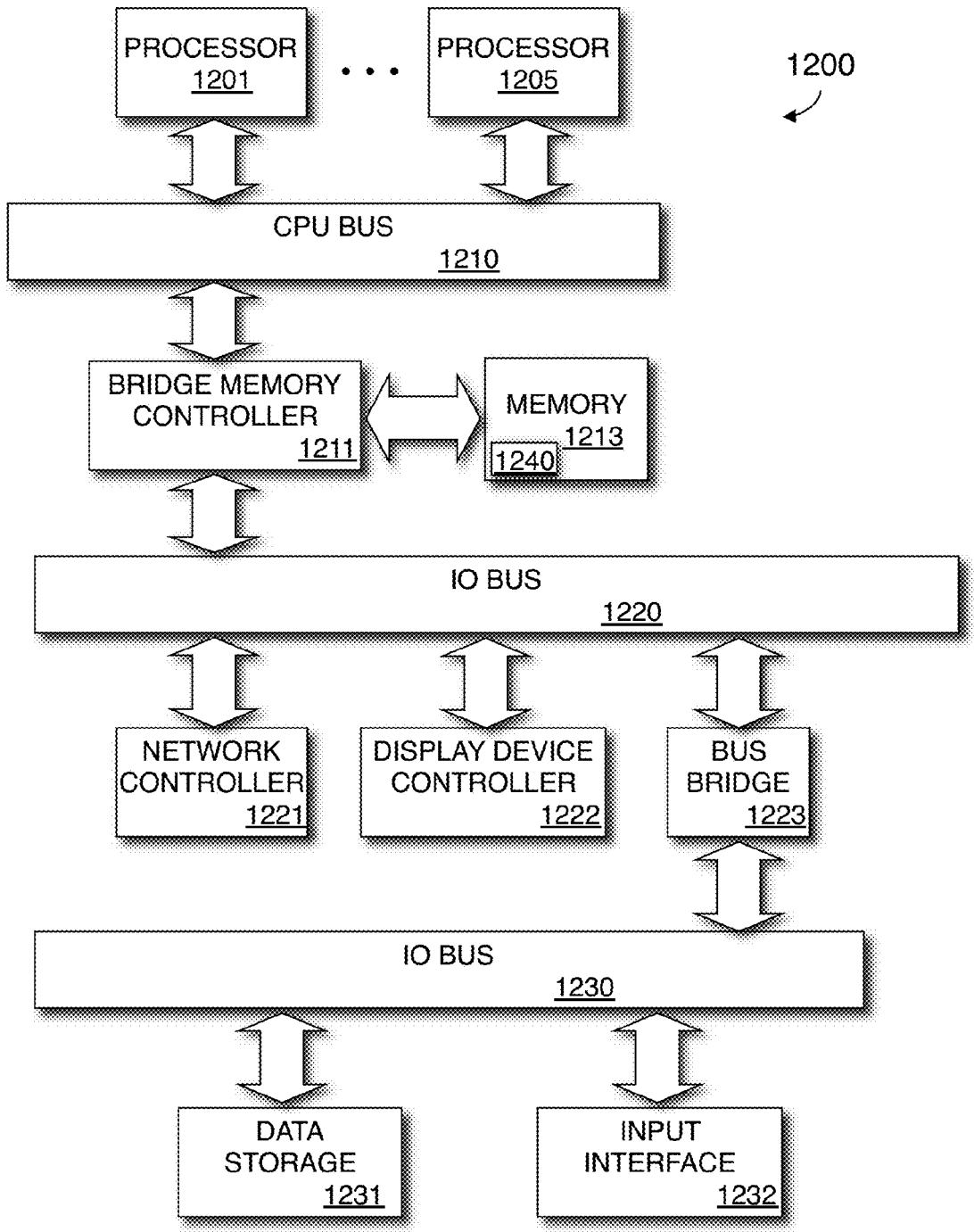
FIG. 12 illustrates a block diagram of a computer system implementing a system designer according to an embodiment of the present invention.

FIG. 12 is a block diagram of an exemplary computer system 1200 in which an example embodiment of the present invention resides. The computer system 1200 includes one or more processors that process data signals. As shown, the computer system 1200 includes a first processor 1201 and an nth processor 1205, where n may be any number. The processors 1201 and 1205 may be multi-core processors with multiple processor cores on each chip. The processors 1201 and 1205 are coupled to a CPU bus 1210 or other switch fabric that transmits data signals between processors 1201 and 1205 and other components in the computer system 1200. According to an embodiment of the present invention, each of the processors or processor cores in the computer system 1200 may operate as a compute node and may execute its own thread. Each thread may execute an instance of a software program in parallel with other threads.

The computer system 1200 includes a memory 1213. The memory 1213 may store instructions and code represented by data signals that may be executed by the processors 1201 and 1205. A bridge memory controller 1211 is coupled to the CPU bus 1210 and the memory 1213. The bridge memory controller 1211 directs data signals between the processors 1201 and 1205, the memory 1213, and other components in the computer system 1200 and bridges the data signals between the CPU bus 1210, the memory 1213, and a first IO bus 1220. According to an embodiment of the present invention, the processors 1201 and 1205 may be directly coupled to the memory 1213 and communicates with the memory 1213 without a bridge memory controller 1211.

The first IO bus 1220 may be a single bus or a combination of multiple buses. The first IO bus 1220 provides communication links between components in the computer system 1200. A network controller 1221 is coupled to the first IO bus 1220. The network controller 1221 may link the computer system 1200 to a network of computers (not shown) and supports communication among the machines. A display device controller 1222 is coupled to the first IO bus 1220. The display device controller 1222 allows coupling of a display device (not shown) to the computer system 1200 and acts as an interface between the display device and the computer system 1200.

A second IO bus 1230 may be a single bus or a combination of multiple buses. The second IO bus 1230 provides communication links between components in the computer system 1200. A data storage device 1231 is coupled to the second IO bus 1230. An input interface 1232 is coupled to the second IO bus 1230. The input interface 1232 allows coupling of an input device to the computer system 1200 and transmits data signals from an input device to the computer system 1200. A bus bridge 1223 couples the first IO bus 1220 to the second IO bus 1230. The bus bridge 1223 operates to buffer and bridge data signals between the first IO bus 1220 and the second IO bus 1230. It should be appreciated that computer systems having a different architecture may also be used to implement the computer system 1200.

A system designer 1240 may reside in memory 1213 and be executed by one or more of the processors 1201 and 1205 or processor cores residing therein. The system designer 1240 may operate to generate HDL, synthesize a system, generate a floor plan, allocate routing resources, generate a compilation schedule, place the system on a target device, route the system on the target device, modify the floor plan, re-allocate routing resources, arbitrate conflicts, assemble the system, and/or perform other procedures such as those described in FIGS. 2, 5, 8, and 10. According to an embodiment of the present invention, the system designer 1240 is a program that includes parts that may be executed by multiple threads simultaneously (in parallel).

It should be appreciated that embodiments of the present invention may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Figure 13:
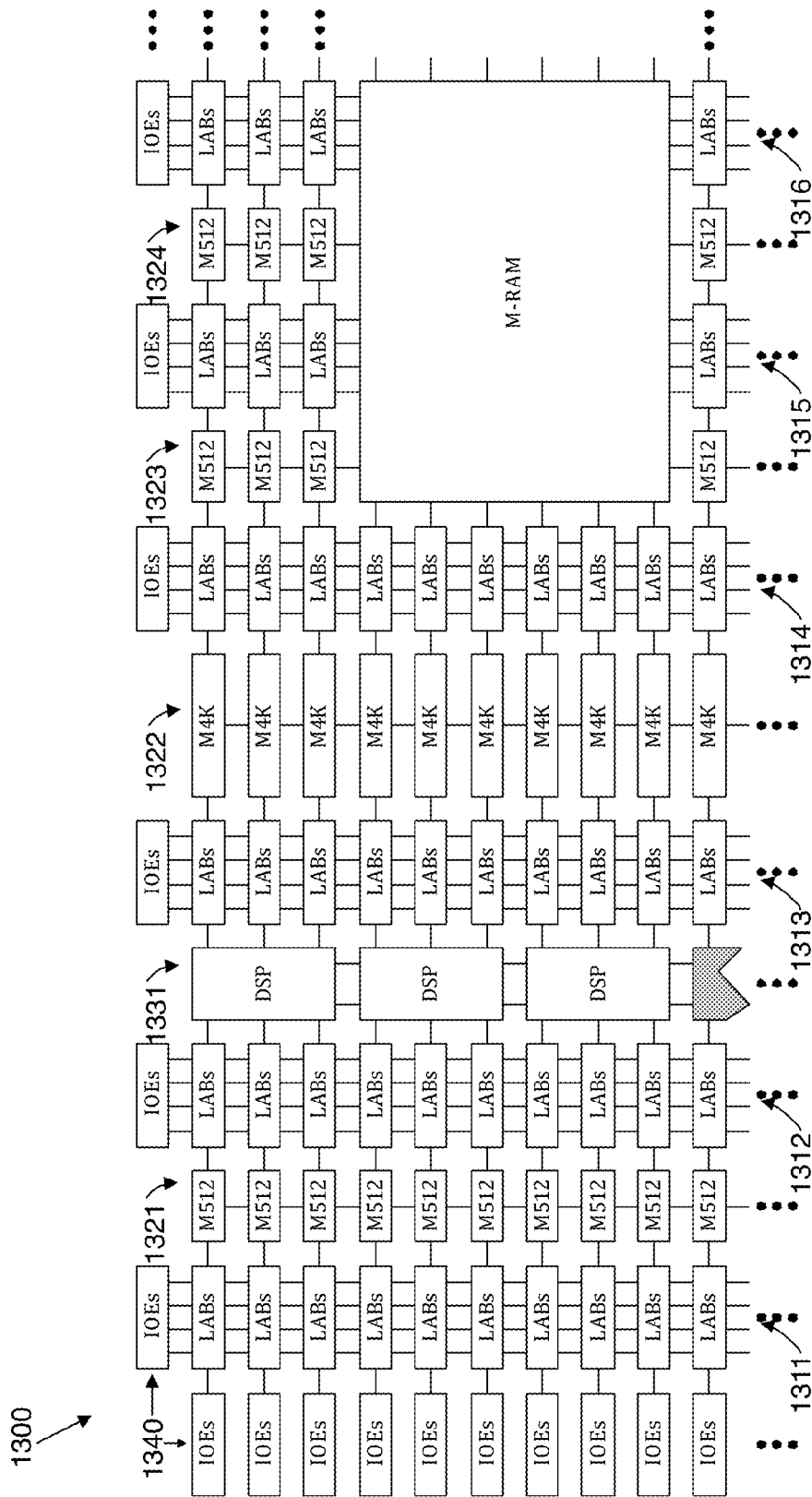
FIG. 13 illustrates an exemplary target device according to an embodiment of the present invention.

FIG. 13 illustrates a device 1300 that may be used to implement a target device according to an embodiment of the present invention. The device 1300 is a field programmable gate array (FPGA) that includes a plurality of logic-array blocks (LABs). Each LAB may be formed from a plurality of logic blocks, carry chains, LAB control signals, look up table (LUT) chain, and register chain connection lines. A logic block is a small unit of logic providing efficient implementation of user logic functions. A logic block includes one or more combinational cells, where each combinational cell has a single output, and registers. According to one embodiment of the present invention, the logic block may operate similarly to a logic element (LE), such as those found in the Stratix or Cyclone devices manufactured by Altera® Corporation, or a combinational logic block (CLB) such as those found in Virtex devices manufactured by Xilinx Inc. In this embodiment, the logic block may include a four input LUT with a configurable register. According to an alternate embodiment of the present invention, the logic block may operate similarly to an adaptive logic module (ALM), such as those found in Stratix devices manufactured by Altera Corporation. LABs are grouped into rows and columns across the device 1300. Columns of LABs are shown as 1311-1316. It should be appreciated that the logic block may include additional or alternate components.

The device 1300 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the device in between selected LABs or located individually or in pairs within the device 1300. Columns of memory blocks are shown as 1321-1324.

The device 1300 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the device 1300 and are shown as 1331.

The device 1300 includes a plurality of input/output elements (IOEs) 1340. Each IOE feeds an IO pin (not shown) on the device 1300. The IOEs 1340 are located at the end of LAB rows and columns around the periphery of the device 1300. Each IOE may include a bidirectional IO buffer and a plurality of registers for registering input, output, and output-enable signals.

The device 1300 may include routing resources such as LAB local interconnect lines, row interconnect lines ("H-type wires"), and column interconnect lines ("V-type wires") (not shown) to route signals between components on the target device.

In the foregoing specification, embodiments of the invention have been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for designing a system on a target device, comprising:
    routing static logic modules and partial reconfigurable (PR) modules on the target device;
    arbitrating routing resources that are in conflict from the routing to static logic modules and PR modules competing for the routing resources;
    assigning unused routing resources from the routing to static logic modules and PR modules having conflicts; and
    re-routing the static logic modules and PR modules having conflicts with the routing resources arbitrated and assigned.

2. The method of claim 1, wherein routing PR modules on a target device comprises routing instances of a PR module serially.

3. The method of claim 1, wherein routing PR modules on the target device comprises routing a first instance of a PR module in parallel with a second instance of the PR module.

4. The method of claim 1, wherein routing the PR modules on the target device comprises preferentially selecting routing resources for a first instance of a PR module that are used by a second instance of the PR module over selecting other routing resources.

5. The method of claim 1, wherein routing the static logic modules and the PR modules comprises selecting routing resources for the static logic modules and the PR modules that are unused by other static logic modules and PR modules preferentially over selecting routing resources that are used by the other static modules or PR modules.

6. The method of claim 1, wherein arbitrating routing resources that are in conflict comprises assigning a routing resource in conflict to a module in response to one of a timing constraint or routing constraint.

7. The method of claim 1, wherein each instance of the PR module comprises a different circuit description of the PR module and each of the different circuit descriptions interfaces with a same static logic components.

8. The method of claim 1 further comprising placing static logic modules prior to placing PR modules on the target device.

9. The method of claim 8, wherein the PR modules are placed in parallel.

10. A non-transitory computer readable medium including a sequence of instructions stored thereon for causing a computer to execute a method comprising:
routing static logic modules and partial reconfigurable (PR) modules on a target device;
arbitrating routing resources that are in conflict from the routing to static logic modules and PR modules competing for the routing resources;
assigning unused routing resources from the routing to static logic modules and PR modules having conflicts; and
re-routing the static logic modules and PR modules having conflicts with the routing resources arbitrated and assigned.

11. The non-transitory computer readable medium of claim 10, wherein routing PR modules on a target device comprises routing instances of a PR module serially.

12. The non-transitory computer readable medium of claim 10, wherein routing PR modules on the target device comprises routing a first instance of a PR module in parallel with a second instance of the PR module.

13. The non-transitory computer readable medium of claim 10, wherein routing the PR modules on the target device comprises preferentially selecting routing resources for a first instance of a PR module that are used by a second instance of the PR module over selecting other routing resources.

14. The non-transitory computer readable medium of claim 10, wherein routing the static logic modules and the PR modules comprises selecting routing resources for the static logic modules and the PR modules that are unused by other static logic modules and PR modules preferentially over selecting routing resources that are used by the other static modules or PR modules.

15. The non-transitory computer readable medium of claim 10, wherein arbitrating routing resources that are in conflict comprises assigning a routing resource in conflict to a module in response to one of a timing constraint or routing constraint.

16. The non-transitory computer readable medium of claim 10, wherein each instance of the PR module comprises a different circuit description of the PR module and each of the different circuit descriptions interfaces with a same static logic components.

17. The non-transitory computer readable medium of claim 10, wherein the method further comprises placing static logic modules prior to placing PR modules on the target device.

18. The non-transitory computer readable medium of claim 17, wherein the PR modules are placed in parallel.

19. A system designer, comprising:
a routing unit that routes static logic modules and partial reconfigurable (PR) modules on the target device;
an arbitration unit that routes resources that are in conflict from the routing to static logic modules and PR modules competing for the routing resources;
an assignment unit that assigns unused routing resources from the routing to static logic modules and PR modules having conflicts, wherein the routing unit re-routes the static logic modules and PR modules having conflicts with the routing resources arbitrated and assigned, wherein at least one of the routing unit, arbitration unit, and assignment unit is implemented by a processor.

\* \* \* \* \*